(12) United States Patent
Nordquist et al.

(10) Patent No.: US 7,865,894 B1
(45) Date of Patent: Jan. 4, 2011

(54) DISTRIBUTING PROCESSING TASKS WITHIN A PROCESSOR

(75) Inventors: Bryon S. Nordquist, Santa Clara, CA (US); John R. Nickolls, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1385 days.

(21) Appl. No.: 11/311,997

(22) Filed: Dec. 19, 2005

(51) Int. Cl.
*G06F 9/46* (2006.01)

(52) U.S. Cl. .................. 718/102; 718/104; 718/100

(58) Field of Classification Search .................. 718/102, 718/104, 105
See application file for complete search history.

(56) References Cited

U.S. PATENT DOCUMENTS

| | | | | |
|---|---|---|---|---|
| 6,330,584 B1 * | 12/2001 | Joffe et al. | ................... | 718/107 |
| 6,897,871 B1 | 5/2005 | Morein | | |
| 6,961,934 B2 * | 11/2005 | Alford et al. | ................. | 718/100 |
| 7,594,232 B2 * | 9/2009 | Klingman | .................... | 718/104 |
| 2002/0174318 A1 | 11/2002 | Stuttard et al. | | |
| 2005/0283786 A1 * | 12/2005 | Dettinger et al. | ............ | 718/104 |
| 2006/0248535 A1 * | 11/2006 | Grover | ....................... | 718/107 |
| 2006/0294326 A1 * | 12/2006 | Jacobson et al. | ............ | 711/156 |
| 2007/0083735 A1 * | 4/2007 | Glew | .......................... | 712/214 |
| 2007/0220517 A1 * | 9/2007 | Lippett | ....................... | 718/102 |

\* cited by examiner

*Primary Examiner*—Lewis A Bullock, Jr.
*Assistant Examiner*—Tammy Lee
(74) *Attorney, Agent, or Firm*—Townsend and Townsend and Crew LLP (57) ABSTRACT

Embodiments of the present invention facilitate distributing processing tasks within a processor. In one embodiment, processing clusters keep track of resource requirements. If sufficient resources are available within a particular processing cluster, the available processing cluster asserts a ready signal to a dispatch unit. The dispatch unit is configured to pass a processing task (such as a cooperative thread array or CTA) to an available processing cluster that asserted a ready signal. In another embodiment, a processing task is passed around a ring of processing clusters until a processing cluster with sufficient resources available accepts the processing task.

10 Claims, 6 Drawing Sheets

DISTRIBUTING PROCESSING TASKS WITHIN A PROCESSOR

CROSS-REFERENCE TO RELATED APPLICATIONS

The present disclosure is related to commonly-assigned co-pending U.S. patent application Ser. No. 11/305,178, filed Dec. 15, 2005, entitled "Parallel Data Processing Systems and Methods Using Cooperative Thread Arrays," the disclosure of which is incorporated herein by reference for all purposes.

BACKGROUND OF THE INVENTION

The present invention relates in general to parallel data processing, and in particular to distributing process tasks within a processor.

Parallel processing techniques enhance throughput of a processor or multiprocessor system when multiple independent computations need to be performed. A computation can be divided into tasks, with each task being performed as a separate thread. (As used herein, a "thread" refers generally to an instance of execution of a particular program using particular input data.) Parallel threads are executed simultaneously using different processing engines.

Numerous existing processor architectures support parallel processing. The earliest such architectures used multiple discrete processors networked together. More recently, multiple processing cores have been fabricated on a single chip. These cores are controlled in various ways. In some instances, known as multiple-instruction, multiple data (MIMD) machines, each core independently fetches and issues its own instructions to its own processing engine (or engines). In other instances, known as single-instruction, multiple-data (SIMD) machines, a core has a single instruction unit that issues the same instruction in parallel to multiple processing engines, which execute the instruction on different input operands. SIMD machines generally have advantages in chip area (since only one instruction unit is needed) and therefore cost; the downside is that parallelism is only available to the extent that multiple instances of the same instruction can be executed concurrently.

Graphics processors have used very wide SIMD architectures to achieve high throughput in image-rendering applications. Such applications generally entail executing the same programs (vertex shaders or pixel shaders) on large numbers of objects (vertices or primitives). Since each object is processed independently of all others using the same sequence of operations, a SIMD architecture provides considerable performance enhancement at reasonable cost. Typically, a GPU includes one SIMD core (e.g., 200 threads wide) that executes vertex shader programs, and another SIMD core of comparable size that executes pixel shader programs. In high-end GPUs, multiple sets of SIMD cores are sometimes provided to support an even higher degree of parallelism.

Typically, in a processor with multiple processing cores, incoming processing tasks are directed to one or another of the cores for execution. Ideally, the tasks are directed to cores in such a way that all cores are fully occupied before any tasks are required to wait. In practice, this usually requires a dispatch unit to track the availability of various resources in each core. Often, resource usage in the core is also tracked elsewhere in the processor, leading to duplication of the resource tracking hardware.

It would therefore be desirable to provide more efficient systems and methods for distributing processing tasks within a processor.

BRIEF SUMMARY OF THE INVENTION

Embodiments of the present invention facilitate distributing processing tasks within a processor. In one embodiment, processing clusters keep track of resource requirements. If sufficient resources are available within a particular processing cluster, the available processing cluster assets a ready signal to a dispatch unit. The dispatch unit is configured to pass a processing task (such as a cooperative thread array or CTA) to an available processing cluster that asserted a ready signal. In another embodiment, a processing task is passed around a ring of processing clusters until a processing cluster with sufficient resources available accepts the processing task.

In one embodiment of the present invention, an apparatus for distributing processing tasks among a number of processing clusters in a processor includes a number of processing clusters. Each processing cluster is configured to execute one or more processing tasks concurrently. The apparatus also includes a dispatch unit coupled to the processing clusters. The dispatch unit is configured to receive a processing task to be executed. Each processing cluster is further configured to assert or deassert a ready signal indicating whether or not sufficient resources are available to execute the processing task. A processing cluster is selected to execute the processing task based at least in part on whether the processing cluster is asserting the ready signal.

According to another embodiment of the present invention, a method for distributing processing tasks among a number of processing clusters in a processor includes receiving a processing task for execution by one of the processing clusters; receiving a ready signal by the dispatch unit from each processing cluster, each ready signal indicating whether or not one of the processing clusters has sufficient resources available to execute the processing task; selecting a processing cluster to execute the processing task based on the ready signals; and sending the processing task to the selected processing cluster for execution.

According to still another embodiment of the present invention, a method for distributing processing tasks among a number of processing clusters in a processor includes receiving a processing task for execution by one of the processing clusters at a dispatch unit; sending the processing task to first processing cluster; and determining by the first processing cluster whether to accept the processing task for execution or to forward the processing task to a second processing cluster. The determination by the first processing cluster is based on whether the first processing cluster has sufficient resources available to execute the processing task.

The following detailed description together with the accompanying drawings will provide a better understanding of the nature and advantages of the present invention.

DETAILED DESCRIPTION OF THE INVENTION

Embodiments of the present invention facilitate distributing processing tasks within a processor. In one embodiment, processing clusters keep track of resource requirements. If sufficient resources are available within a particular processing cluster, the available processing cluster asserts a ready signal to a dispatch unit. The dispatch unit is configured to pass a processing task (such as a cooperative thread array or CTA) to an available processing cluster that asserted a ready signal. In another embodiment, a processing task is passed around a ring of processing clusters until a processing cluster with sufficient resources available accepts the processing task.

System Overview

Figure 1:
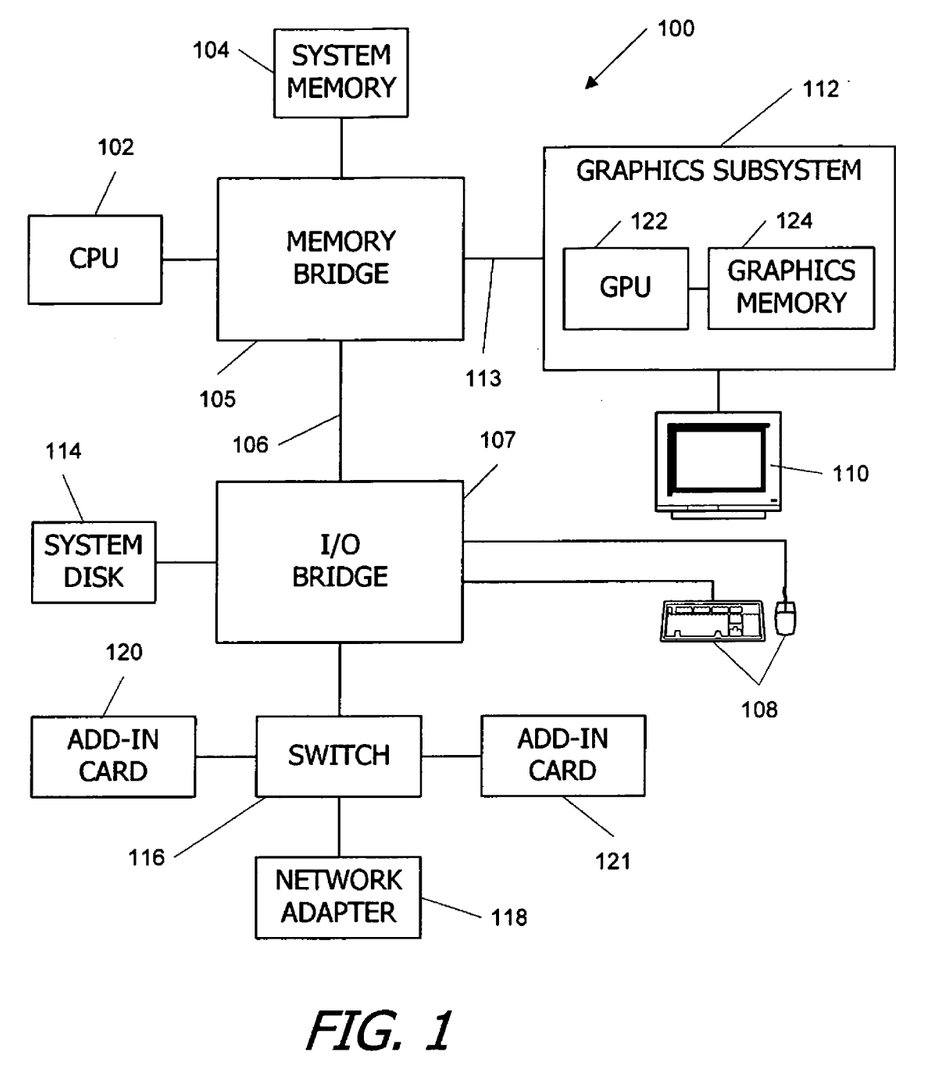
FIG. 1 is a block diagram of a computer system according to an embodiment of the present invention.

FIG. 1 is a block diagram of a computer system 100 according to an embodiment of the present invention. Computer system 100 includes a control processor or central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to I/O bridge 107 via a bus 113. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Accelerated Graphics Port), HyperTransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the control processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. In some embodiments, GPU 122 may provide general-purpose data processing, and display device 110 may be omitted.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices, or to reduce the time needed to process data.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
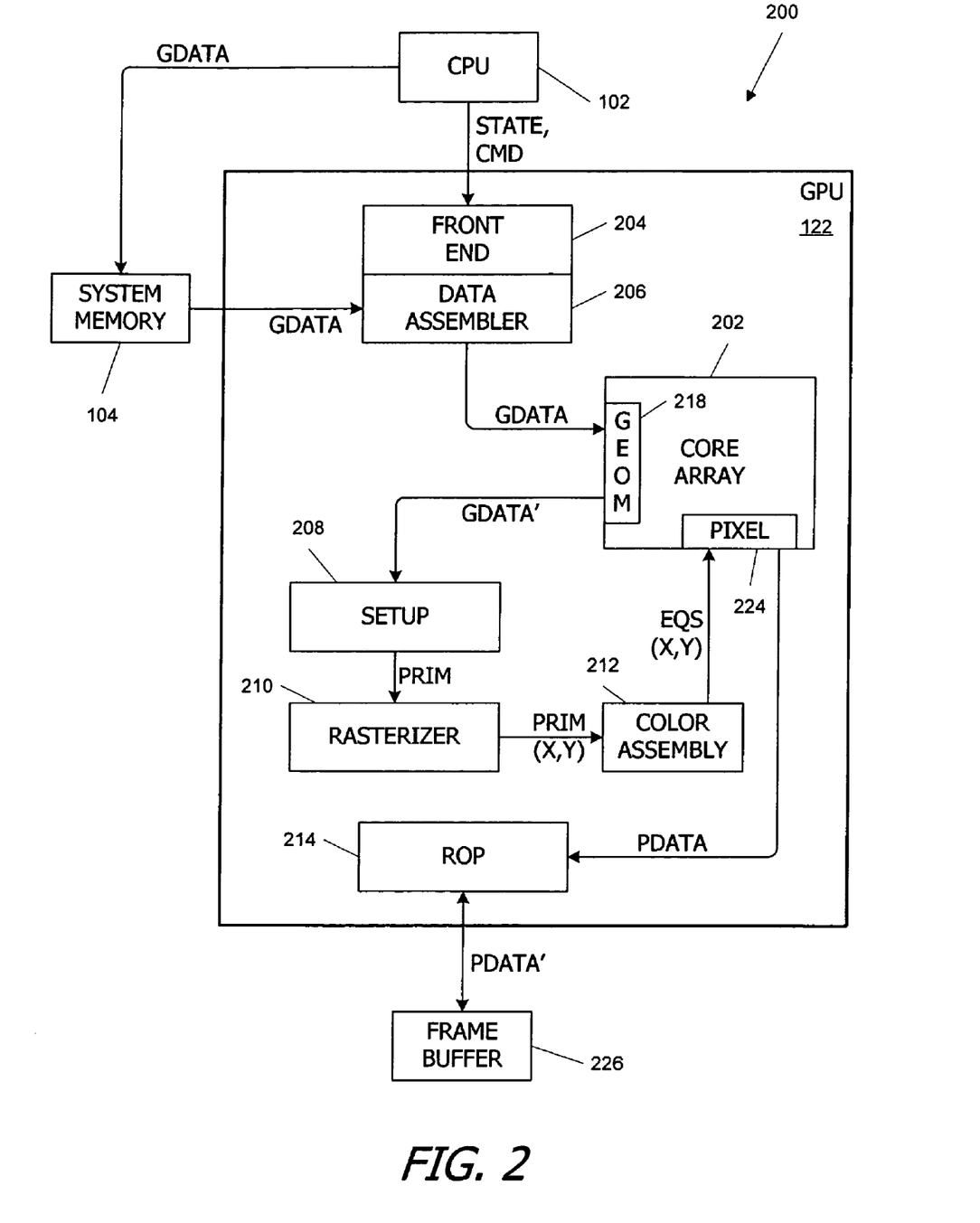
FIG. 2 is a block diagram of a rendering pipeline that can be implemented in the GPU of FIG. 1 according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a core array 202. Core array 202 is described further below.

In addition to core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in core array 202.

Geometry module 218 directs programmable processing engines (not explicitly shown) in core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space; conventional techniques may be used.

Color assembly module 212 provides the attribute equations (EQS) for each primitive that covers at least one pixel and a list of screen coordinates (X,Y) of the covered pixels to a pixel module 224 in core array 202. Pixel module 224 directs programmable processing engines (not explicitly shown) in core array 202 to execute one or more pixel shader programs on each pixel covered by the primitive, with the program(s) being selected in response to the state information provided by front end 204.

Pixel shader programs are advantageously executed in core array 202 using the same programmable processing engines that also execute the vertex and/or geometry shader programs. Thus, at certain times, a given processing engine may operate as a vertex shader, receiving and executing vertex program instructions; at other times the same processing engine may operate as a geometry shader, receiving and executing geometry program instructions; and at still other times the same processing engine may operate as a pixel shader, receiving and executing pixel shader program instructions.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124 or system memory 104. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

Multithreaded Core Array Configuration

Figure 3:
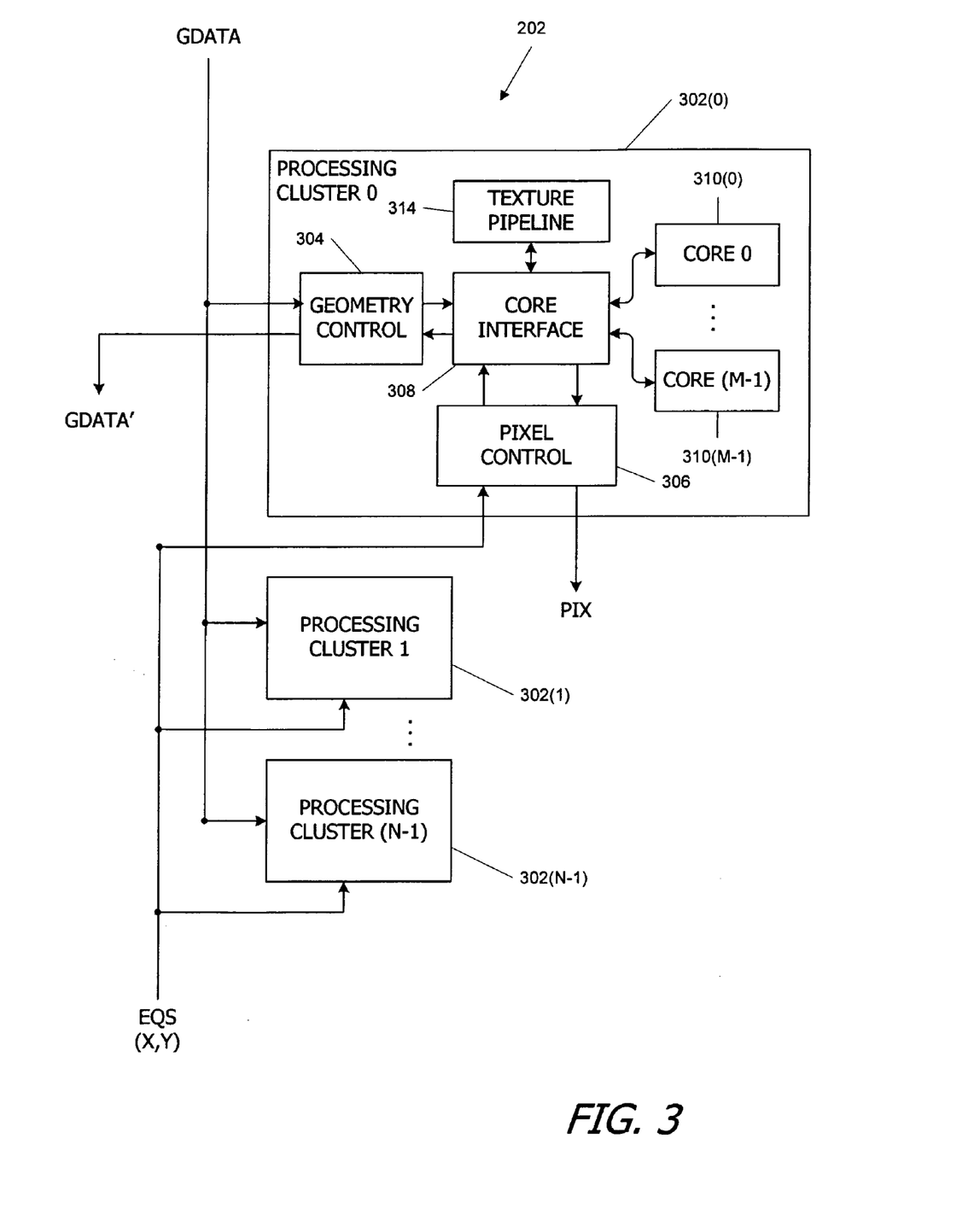
FIG. 3 is a block diagram of a multithreaded processor array according to an embodiment of the present invention.

In one embodiment, core array 202 provides a highly parallel architecture that supports concurrent execution of a large number of instances of vertex, geometry, and/or pixel shader programs, as well as general-purpose data processing programs, in various combinations. FIG. 3 is a block diagram of core array 202 according to an embodiment of the present invention.

In this embodiment, core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Cooperative Thread Arrays (CTAs)

In accordance with an embodiment of the present invention, core 310 of GPU 122 is a multithreaded processing core that can be leveraged for general-purpose computations by executing cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations that lend themselves to a data parallel decomposition, i.e., application of the same processing algorithm to different portions of an input data set in order to effect a transformation of the input data set to an output data set. The processing algorithm is specified in a "CTA program," and each thread in a CTA executes the same CTA program on a different subset of an input data set. A CTA program can implement algorithms using a wide range of mathematical and logical operations, and the program can include conditional or branching execution paths and direct and/or indirect memory access.

Threads in a CTA can share intermediate results with other threads in the same CTA using a shared memory or global register file that is accessible to all of the threads, an interconnection network, or other technologies for inter-thread communication, including other technologies known in the art. In some embodiments, the CTA program includes an instruction to compute an address in shared memory to which particular data is to be written, with the address being a function of thread ID. Each thread computes the function using its own thread ID and writes to the corresponding location. The function is advantageously defined such that different threads write to different locations; as long as the function is deterministic, the location written to by any thread is well-defined. The CTA program can also include an instruction to compute an address in shared memory from which data is to be read, with the address being a function of thread ID. By defining suitable functions, data can be written to a given location by one thread and read from that location by a different thread in a predictable manner. Consequently, any desired pattern of data sharing among threads can be supported, and any thread in a CTA can share data with any other thread in the same CTA.

Since all threads in a CTA execute the same program, any thread can be assigned any thread ID, as long as each valid thread ID is assigned to only one thread. In one embodiment, thread IDs are assigned sequentially to threads as they are launched, as described below. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (T) of threads, thread IDs are simply sequential (one-dimensional) index values from 0 to T−1. In other embodiments, multidimensional indexing schemes can be used.

In addition to thread IDs, some embodiments also provide a CTA identifier that is common to all threads in the CTA. A CTA identifier can be helpful to a programmer, e.g., where an input data set is to be processed using multiple CTAs that process different (possibly overlapping) portions of an input data set. The CTA identifier may be stored in a local register of each thread, in a state register accessible to all threads of the CTA, or in other storage accessible to the threads of the CTA.

While all threads within a CTA are executed concurrently, there is no requirement that different CTAs are executed concurrently, and the hardware need not support sharing of data between threads in different CTAs.

It will be appreciated that the size of a CTA and number of CTAs required for a particular application will depend on the application. Thus, the size of a CTA, as well as the number of CTAs to be executed, are advantageously defined by the programmer and provided to core 310 and core interface 308 as state parameters.

CTAs are described in further detail in above-referenced application Ser. No. 11/305,178.

Balancing CTA Loads

It is desirable to process CTAs quickly, especially when a large number of CTAs need to be processed in a real-time computation, such as in a HDTV (High Definition Television) filtering application that might involve several thousand CTAs per frame. For maximum performance, it is desirable to keep all the cores fully loaded with CTAs to the extent possible.

Referring back to FIG. 3, in one embodiment of the present invention, a core array 202 has N processing clusters with M cores each. In this embodiment, there are N*M cores available to process CTAs. Each core 310 is configured to execute one or more CTAs depending on the resources available for each core and the resources required to process a CTA. The term "resources" refers to any item that is required to process a CTA and that exists in limited supply, such as the number of threads that can be concurrently executed in a core, the global register file space available, and/or the local register file space available in the core. It should be appreciated that these resources are limited within each core 310. A core can continue to accept additional CTAs as long as the core has a sufficient amount of all resources. As CTAs are received into the processor array, the CTAs are advantageously directed to a processing cluster that has a core with sufficient resources to begin executing the CTA immediately. As long as at least one processing cluster has sufficient resources available, additional CTAs are accepted; once all cores are fully loaded, subsequently received CTAs may be stalled until a core becomes available.

In some processors, a dispatch unit that dispatches CTAs to processing clusters also keeps track of free resources in each processing cluster. The dispatch unit uses the resource information to select a processing cluster to process each CTA. However, each core interface also keeps track of available resources in each of its cores, resulting in two components that keep track of resources. Embodiments of the present invention eliminate the need for the dispatch unit to keep track of resources by enabling each core interface to determine whether it has sufficient available resources to accept a new CTA.

Figure 4:
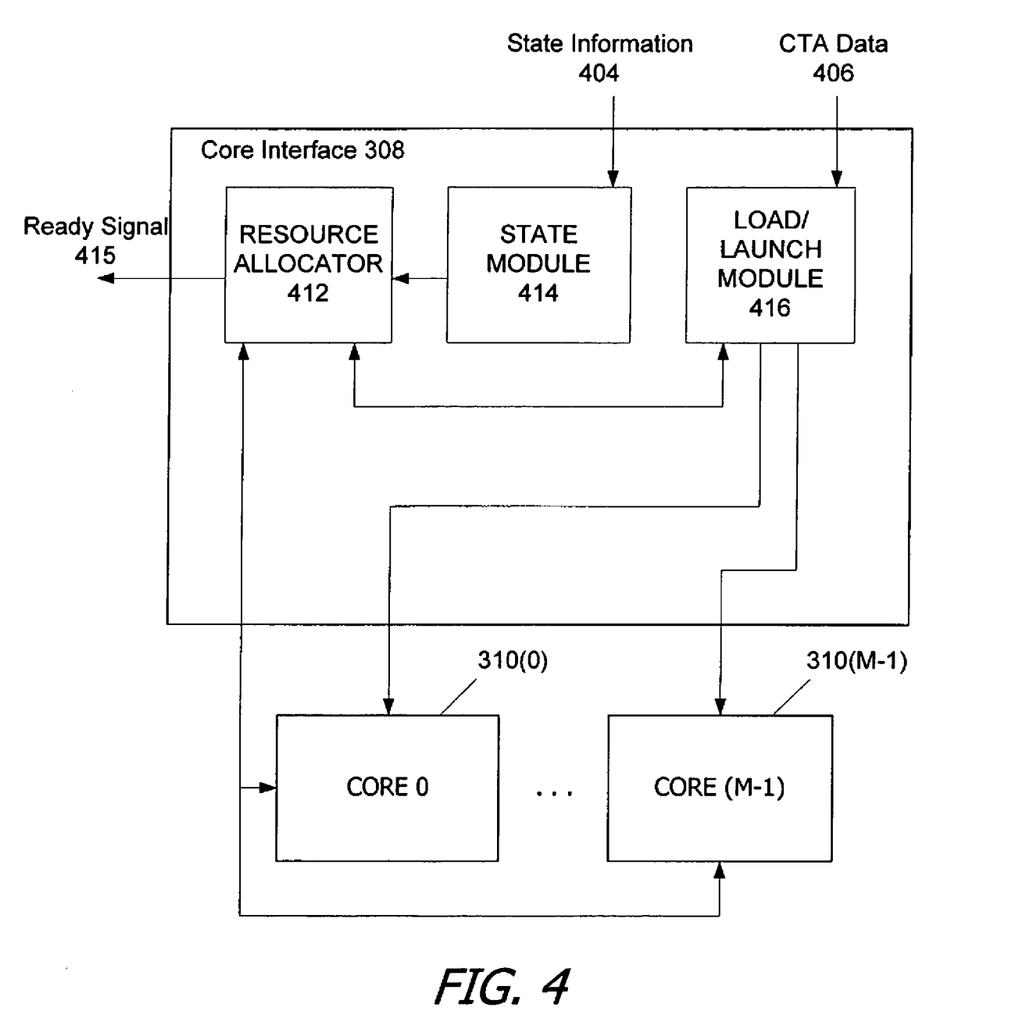
FIG. 4 is a block diagram of a core interface configured to generate a ready signal according to an embodiment of the present invention.

FIG. 4 is a block diagram of a core interface 308 configured to generate a ready signal according to an embodiment of the present invention. Core interface 308 includes a resource allocator 412, a state module 414, and a load/launch module 416. State module 414 is configured to store state information 404 defining the CTA, such as the number of threads in each CTA, the amount of global and local register file space each CTA needs, etc. Resource allocator 412 tracks the resources being used in each core 310. In one embodiment, resource allocator 412 keeps a table of free resources and updates this table in real-time as CTAs are received and completed. Based on what resources are being used and what resources are required to start another CTA, resource allocator 412 determines whether to assert ready signal 415.

In some embodiments, resource allocator 412 is configured to allocate a sufficient amount of each resource in processing core 310 for use in processing a CTA. Load/launch module 416 can be configured to request an allocation of resources for a CTA from resource allocator 412 in response to receiving a first block of CTA data 406 for the CTA. Resource allocator 412 selects and allocates free resources from its table. In some embodiments, resource allocator 412 can be configured to delay load/launch module 416 from receiving further input data for the CTA in the event that sufficient resources for processing the CTA are not available. Resource allocator 412 can manage various resources, including but not limited to space in a local register file and/or registers in a program counter array, the registers being usable to store program counters for threads of the CTA.

Load/launch module 416 loads CTA data 406 into a register file in core 310 selected by resource allocator 412, and signals core 310 to start executing the CTA. State module 414 receives state information needed for resource allocation. This state information may include, but is not limited to, the number of threads per CTA, amount of global register space required, and the local register space needed.

Resource allocator 412 determines whether to assert ready signal 415. In one embodiment, resource allocator 412 uses current state information in state module 414 to determine what resources are needed for executing a next CTA. The table of free resources is accessed by resource allocator 412 to compare what is available in the core interface to what is needed to execute the next CTA. If the comparison indicates that sufficient resources are available, resource allocator 412 asserts ready signal 415. In some embodiments, resource allocator 412 can also determine how many additional CTAs it can accept given the available resources.

A processor may include multiple processing cores 310 and multiple core interface units 308 (see FIG. 3). In one embodiment of the present invention, each core interface 308 (of each processing cluster 302) is configured to assert the ready signal when the processing cluster has sufficient resources available to process an additional CTA. The dispatch unit may directly send new CTA data 406 to the load/launch module 416 of the available processing cluster. In this embodiment, the dispatch unit decides which processing cluster will process the CTA.

In another embodiment of the present invention, the dispatch unit and processing clusters are connected in a ring topology. The dispatch unit sends a CTA to a first processing cluster in the ring. When the CTA is presented to a processing cluster, the processing cluster uses its own ready signal to determine whether to accept the CTA or pass the CTA to the next processing cluster in the ring. If none of the processing clusters can accept the CTA, the CTA is eventually passed back to the dispatch unit which recirculates the CTA until one of the processing clusters accepts the CTA. In this embodiment, the processing cluster decides whether it will process a particular CTA.

Dispatch Unit Decides Which Processing Cluster Will Execute CTA

Figure 5:
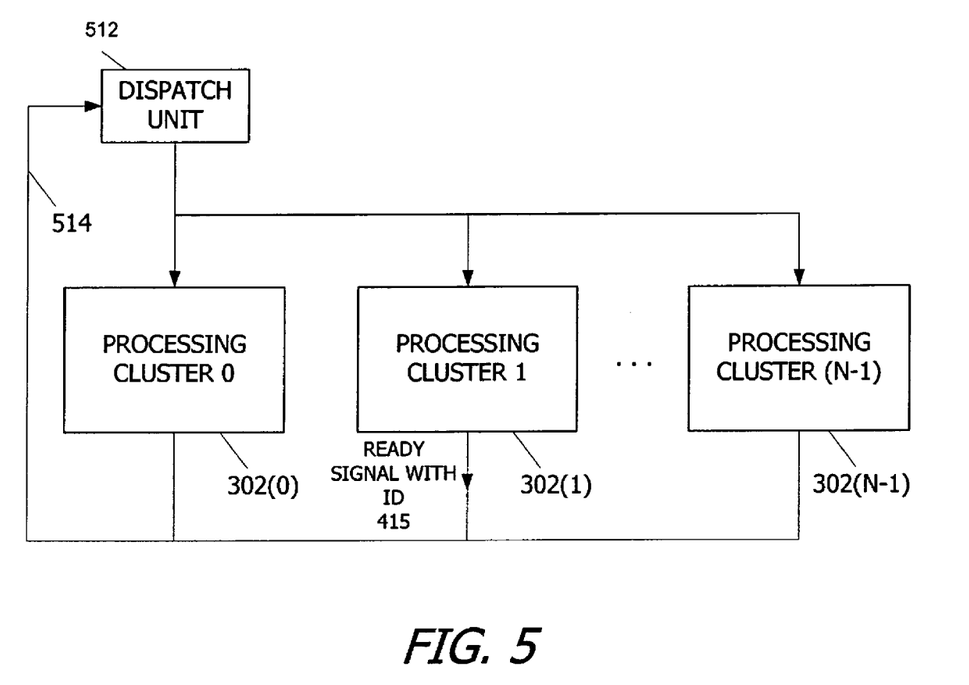
FIG. 5 is a block diagram of a dispatch unit configured to determine which processing cluster receives a cooperative thread array (CTA) according to an embodiment of the present invention.

FIG. 5 is a block diagram of a dispatch unit configured to determine which processing cluster receives a cooperative thread array (CTA) according to an embodiment of the present invention. In one embodiment of the present invention, dispatch unit 512 may be implemented in color assembly module 212 of FIG. 2. Color assembly module 212 is leveraged to forward CTAs to processing clusters 302 during general-purpose computing operations. In other embodiments, dispatch unit 512 is a separate unit configured to forward CTAs to processing clusters. It should be appreciated that any number of processing clusters 302 may be coupled to dispatch unit 512.

When a processing cluster has sufficient available resources to process a CTA, the resource allocator of the processing cluster may assert a ready signal to dispatch unit 512. For example, as shown in FIG. 5, processing cluster 302(1) sends ready signal 415 via a bus 514 to dispatch unit 512. In one embodiment, ready signal 415 is associated with a cluster identifier (ID) so that dispatch unit 512 can identify which processing cluster sent a particular ready signal. In an alternative embodiment, each processing cluster has a separate dedicated path to dispatch unit 512 (e.g., a star topology) so that each ready signal is separately received by dispatch unit 512. When dispatch unit 512 receives a CTA to be executed, dispatch unit 512 selects a processing cluster whose ready signal 415 is asserted to receive the CTA. In some embodiments, the CTA may be sent via a point-to-point connection to each processing cluster (e.g., dispatch unit 512 has a dedicated connection to each processing cluster, such as a star topology). In other embodiments, e.g., where dispatch unit 512 has a bus, pipeline, or daisy chain connection to the processing clusters, the dispatch unit sends the CTA together with the ID tag of the processing cluster selected to process the CTA; the selected processing cluster accepts the CTA and all other processing clusters ignore the CTA.

In one embodiment of the present invention, each processing cluster independently asserts or deasserts its ready signal. It may be possible that two or more processing clusters simultaneously assert ready signals to dispatch unit 512. In accordance with one embodiment of the present invention, if dispatch unit 512 receives multiple asserted ready signals at the same time, dispatch unit 512 selects the processing cluster to process the new CTA. For example, if processing cluster 302(0) and 302(1) both assert ready signals, dispatch unit 512 could decide to send the new CTA to processing cluster 302(0) or 302(1). The decision may depend on a number of factors, which are described below.

Processing clusters may be configured to generate a ready signal 415 that includes priority information. For example, processing cluster 302(1) may assert a ready signal with "ready 1" representing enough free resources for just one new CTA, while processing cluster 302(0) may assert a ready signal with "ready 2" representing enough free resources for two new CTAs. Thus, in some embodiments, ready signal 415 specifies to dispatch unit 512 how many additional CTAs the ready processing cluster can accept. If cluster 302(1) asserts "ready 1" while cluster 302(0) asserts "ready 2," dispatch unit 512 would select processing cluster 302(0) and send the new CTA to processing cluster 302(0) because it is less heavily loaded and therefore likely to execute the new CTA faster.

It should be appreciated that other factors could affect the decision making of dispatch unit 512. For example, the proximity of a processing cluster (in terms of the connection path) could be a factor. In one embodiment, if a number of processing clusters are ready, the dispatch unit selects the ready processing cluster that is nearest the dispatch unit to receive the new CTA. In another embodiment, the dispatch unit selects the next ready processing cluster in a round-robin sequence. In still another embodiment, the dispatch unit may select processing clusters in a fixed sequence (e.g., round-robin), waiting if necessary until the next cluster in the sequence is ready. In yet another embodiment, the dispatch unit selects the ready processing cluster that was least recently selected.

Processing Cluster Decides Whether to Accept CTA

Figure 6:
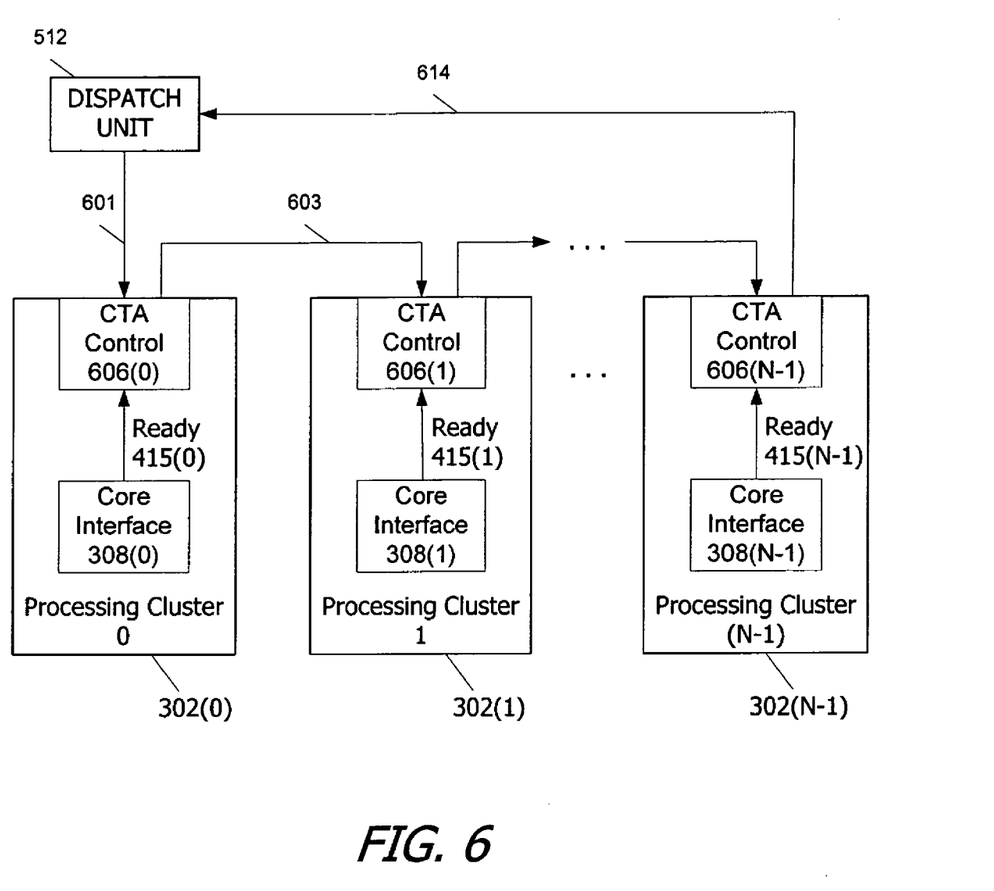
FIG. 6 is a block diagram of a dispatch unit coupled to a number of processing clusters in a ring topology according to an embodiment of the present invention.

FIG. 6 is a block diagram of a dispatch unit coupled to a number of processing clusters in a ring topology. According to one embodiment of the present invention, each new CTA is passed around the ring of processing clusters until a processing cluster with available resources accepts the CTA.

Processing clusters 302 are arranged in a ring so that a CTA received by dispatch unit 512 can be forwarded around the ring until a processing cluster with sufficient available resources accepts the CTA for processing. The last processing cluster 302(N-1) has a link 614 that wraps back to dispatch unit 512.

In FIG. 6, each processing cluster has a core interface 308 that is configured to generate a ready signal signaling that sufficient resources are available to process a new CTA (e.g., as shown in FIG. 4). Ready signal 415 remains inside the processing cluster and is sent to CTA control module 606. In some embodiments, CTA control module 606 may be implemented in pixel control module 306 of FIG. 3. CTA control module 606 is configured to receive new CTAs and to decide whether a CTA is to be accepted for processing or passed on to a next processing cluster.

For example, in the embodiment shown, dispatch unit 512 sends each new CTA to CTA control module 606(0) of processing cluster 302(0) via link 601. If core interface 308(0) has not asserted ready signal 415(0) to CTA control module 606(0), then CTA control module 606(0) determines that processing cluster 0 is not ready and passes the new CTA to CTA control module 606(1) via link 603. If core interface 308(1) has not asserted a ready signal 415(1) to CTA control module 606(1), then CTA control module 606(1) determines that processing cluster 1 is not ready and passes the new CTA to the next processing cluster. This process is repeated until the new CTA is accepted by a processing cluster, which occurs when one of core interfaces 308 is asserting the ready signal when the CTA arrives at the corresponding CTA control module 606. The processing cluster that accepts the new CTA does not send the new CTA to the next processing cluster. If no processing clusters accept the new CTA, the new CTA is eventually passed back to dispatch unit 512 via link 614, and dispatch unit 512 resends the CTA around the ring. Dispatch unit 512 advantageously does not distribute additional CTAs until the current CTA is accepted by a processing cluster. This process may repeat so that a large number of CTAs are processed in parallel.

Dispatch unit 512 resends the same CTA to CTA control module 606(0). For illustrative purposes, on this second circulation of the CTA, suppose that processing cluster 0 is busy (i.e., ready signal 415(0) is deasserted) and processing cluster 1 is now ready (i.e., ready signal 415(1) is asserted). Since CTA control module 606(0) still has not received a ready signal, CTA control module 606(0) passes the CTA to CTA control module 606(1). Core interface 308(1) of processing cluster 1 now has asserted a ready signal 415(1) to CTA control module 606(1). The CTA is accepted by CTA control module 606(1) and delivered to a processing core (not shown) inside processing cluster 302(1) to be processed. Thus, in this embodiment, each CTA is accepted by a processing cluster with available resources as soon as one becomes available. In this manner, the processing clusters decide which processing cluster will process each CTA, and the dispatch unit does not control which processing cluster performs the work. In some embodiments, the dispatch unit does not know which processing cluster accepts a particular CTA, only whether the CTA has been accepted.

In other embodiments, the processing cluster that accepts a CTA communicates with dispatch unit 512 to inform dispatch unit 512 as to which processing cluster has accepted the CTA (e.g., by sending a "CTA accepted" token around the ring to dispatch unit 512).

Further Embodiments

While the invention has been described with respect to specific embodiments, one skilled in the art will recognize that numerous modifications are possible. For instance, as noted above, the number of processing clusters, the number of cores and the like can be varied. The number and maximum size of various CTA dimensions can also be varied, and a CTA may be made as large as desired provided that any potential data sharing among the threads can be supported.

Embodiments described herein may make reference to all threads of a CTA being executed concurrently. As used herein, "concurrently" means that at least a portion of the execution of each thread overlaps in time with a portion of the execution of another thread; it is not required that all threads (or even any two threads) begin or end their execution at the same time. The present invention may be used to dispatch multiple instances of any type of processing task, including but not limited to CTAs.

In some embodiments using a GPU, CTA threads and rendering threads can coexist in the same processor, e.g., in different cores or in the same core. Further, in systems with multiple GPUs, one GPU may be used for rendering images while the other is used for general-purpose computations including CTAs.

Further, while the embodiments described herein refer to processing cores of a GPU, it will be appreciated that multithreaded cores (with or without SIMD instruction issue) can be provided in other processors, including general-purpose processors such as CPUs, as well as math or physics coprocessors, and so on. CTAs as described herein may be executed by any processing core that executes multiple threads and that supports sharing of data between threads and the ability to supply each individual thread with its own unique identifier.

Those skilled in the art will also appreciate that the invention is not limited to CTAs. Any type of processing task, including single threads, groups of threads, individual instructions, or any other task can be distributed to one of a number of processing cores using the techniques described herein.

Thus, it is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An apparatus for distributing processing tasks among a plurality of processing clusters in a processor, the apparatus comprising:
a plurality of processing clusters, each processing cluster configured to execute one or more processing tasks concurrently, the one or more processing tasks comprising one or more cooperative thread arrays (CTA), wherein a CTA is a group of multiple threads that concurrently execute the same program on an input data set to produce an output data set;
a dispatch unit coupled to the plurality of processing clusters and configured to:
receive a processing task to be executed; and
forward the processing task to a first processing cluster, wherein:
each processing cluster is further configured to assert or deassert a ready signal indicating whether or not sufficient resources are available to execute the processing task;
wherein a processing cluster is selected to execute the processing task based at least in part on whether the processing cluster is asserting the ready signal;
the first processing cluster is configured to forward the processing task to a next processing cluster in the event that a ready signal is not asserted by the first processing cluster; and
a last one of the processing clusters is configured to return the processing task to the dispatch unit in the event that the ready signal is not asserted by the last processing cluster.

2. The apparatus of claim 1, wherein the dispatch unit receives the ready signal from each of the processing clusters and selects one of the processing clusters that is asserting the ready signal to execute the processing task.

3. The apparatus of claim 2, wherein the dispatch unit selects the processing cluster based on at least one of:
a determination as to which of the processing clusters asserting the ready signal is next in a predetermined sequence;
a determination as to which of the processing clusters asserting the ready signal is least recently selected;
a proximity of the processing cluster to the dispatch unit; or
a number of processing tasks that the processing cluster is ready to accept.

4. The apparatus of claim 1, wherein each of the processing clusters is directly connected to the dispatch unit.

5. The apparatus of claim 1, wherein the processing clusters are connected to the dispatch unit via a bus, pipeline, or daisy chain topology.

6. The apparatus of claim 1, wherein the processing clusters and the dispatch unit are connected in a ring topology.

7. A method for distributing processing tasks among a plurality of processing clusters in a processor, the method comprising:
- receiving a processing task comprising one or more cooperative thread arrays (CTA) for execution by one of the processing clusters, wherein a CTA is a group of multiple threads that concurrently execute the same program on an input data set to produce an output data set;
- sending the processing task to a first processing cluster for execution, wherein:
  - a processing cluster is selected to execute the processing task based at least in part on whether the processing cluster is asserting a ready signal;
  - the first processing cluster is configured to forward the processing task to a next processing cluster in the event that a ready signal is not asserted by the first processing cluster; and
- receiving the processing task at a dispatch unit from a last processing cluster, wherein the last processing cluster is configured to return the processing task to the dispatch unit in the event that the ready signal is not asserted by the last processing cluster.

8. A method for distributing processing tasks among a plurality of processing clusters in a processor, the method comprising:
- receiving, at a dispatch unit, a processing task for execution by one of the processing clusters, the processing task comprising a cooperative thread array (CTA), wherein the CTA is a group of multiple threads that concurrently execute the same program on an input data set to produce an output data set;
- sending the processing task from the dispatch unit to a first one of the processing clusters; and
- determining, by the first processing cluster, whether to accept the processing task for execution or to forward the processing task to a second processing cluster, wherein:
- the determination by the first processing cluster is based on whether the first processing cluster has sufficient resources available to execute the processing task;
- the second processing cluster and any subsequent processing clusters each determine whether to accept the processing task or continue to forward the processing task; and
- in the event that a last one of the processing clusters does not have sufficient resources available to execute the processing task, the last processing cluster returns the processing task to the dispatch unit.

9. The method of claim 8, wherein the dispatch unit resends the returned processing task to the first processing cluster.

10. The method of claim 9, wherein the dispatch unit does not send any subsequent processing tasks to the first processing cluster until the returned processing task is accepted by one of the processing clusters.

* * * * *